United States Patent
Yu et al.

(10) Patent No.: US 11,995,155 B2
(45) Date of Patent: May 28, 2024

(54) ADVERSARIAL IMAGE GENERATION METHOD, COMPUTER DEVICE, AND COMPUTER-READABLE STORAGE MEDIUM

(71) Applicant: Shenzhen Institutes of Advanced Technology, Guangdong (CN)

(72) Inventors: Jiaao Yu, Guangdong (CN); Lei Peng, Guangdong (CN); Huiyun Li, Guangdong (CN)

(73) Assignee: Shenzhen Institutes of Advanced Technology, Guangdong (CN)

( * ) Notice: Subject to any disclaimer, the term of this patent is extended or adjusted under 35 U.S.C. 154(b) by 358 days.

(21) Appl. No.: 17/542,692

(22) Filed: Dec. 6, 2021

(65) Prior Publication Data

US 2022/0092336 A1    Mar. 24, 2022

Related U.S. Application Data

(63) Continuation of application No. PCT/CN2020/081442, filed on Mar. 26, 2020.

(51) Int. Cl.
*G06F 18/00* (2023.01)
*G06F 18/2413* (2023.01)
(Continued)

(52) U.S. Cl.
CPC ......... *G06F 18/2413* (2023.01); *G06F 21/36* (2013.01); *G06N 3/045* (2023.01)

(58) Field of Classification Search
CPC .... G06F 18/2413; G06F 21/36; G06F 21/577; G06F 2221/033; G06N 3/045
(Continued)

(56) References Cited

U.S. PATENT DOCUMENTS 10,984,272 B1 * 4/2021 Shrivastava .............. G06T 5/70
11,501,206 B2 * 11/2022 Ermans ............... G06F 18/2148
(Continued)

FOREIGN PATENT DOCUMENTS

CA      3033014 A1    8/2019
CN    109165671 A    1/2019
(Continued)

OTHER PUBLICATIONS

Kui, Ren, et al., "Adversarial Attacks and Defenses in Deep Learning. Engineering," https://doi.org/10/1016/J.Eng.2019.12.012, Engineering 2020, 6(3), Mar. 16, 2020, pp. 346-360.
(Continued)

*Primary Examiner* — Van D Huynh
(74) *Attorney, Agent, or Firm* — IP Spring

(57) ABSTRACT

An adversarial image generation method, a computer device, and a computer-readable storage medium are provided. The method includes the following. A reference model classification-equivalent with a target classification model is generated according to the target classification model. A target image is obtained and an original noise for the target image is generated according to the reference model. A first noise and the original noise are input into an adversarial model and a second noise corresponding to the first noise is output when the adversarial model meets a convergence condition, where the second noise enhances an information entropy of the original noise. An enhanced noise image corresponding to the target image is generated according to the second noise and the target image, where a classification accuracy of the enhanced noise image in the target classification model is less than a classification accuracy of the target image in the target classification model.

20 Claims, 11 Drawing Sheets

(51) Int. Cl.
*G06F 21/36* (2013.01)
*G06N 3/045* (2023.01)

(58) Field of Classification Search
CPC ........ G06N 3/047; G06N 3/08; G06V 10/454; G06V 30/226; G06V 10/772; G06V 10/774; G06V 10/776; G06V 10/82; G06V 30/18057; G06V 30/1914; G06V 30/19147

See application file for complete search history.

(56) References Cited

U.S. PATENT DOCUMENTS

| | | | | |
|---|---|---|---|---|
| 11,836,256 | B2* | 12/2023 | Chen | ........................ G06N 3/04 |
| 2019/0005386 | A1* | 1/2019 | Chen | ........................ G06V 10/82 |
| 2019/0220755 | A1* | 7/2019 | Carbune | ................ G06N 20/00 |
| 2019/0236402 | A1* | 8/2019 | Goswami | ............... G06V 40/30 |
| 2019/0238568 | A1* | 8/2019 | Goswami | ............. G06F 21/566 |
| 2019/0251612 | A1 | 8/2019 | Fang et al. | |
| 2020/0234110 | A1* | 7/2020 | Singh | ........................ G06N 3/04 |
| 2020/0285952 | A1* | 9/2020 | Liu | ........................... G06N 3/08 |
| 2020/0410228 | A1* | 12/2020 | Wang | ....................... G06N 3/04 |
| 2021/0049505 | A1* | 2/2021 | Wang | ..................... G06N 20/00 |
| 2021/0133317 | A1* | 5/2021 | Pham | ..................... G06F 16/51 |
| 2021/0150367 | A1* | 5/2021 | Kwak | .................... G06N 3/045 |
| 2022/0198790 | A1* | 6/2022 | Li | ........................... G06V 10/28 |
| 2022/0292356 | A1* | 9/2022 | Singh | ................... G06F 21/577 |

FOREIGN PATENT DOCUMENTS

| | | |
|---|---|---|
| CN | 109214973 A | 1/2019 |
| CN | 109992931 A | 7/2019 |
| CN | 110120024 A | 8/2019 |
| CN | 110147456 A | 8/2019 |
| CN | 110516695 A | 11/2019 |
| CN | 110728319 A | 1/2020 |
| CN | 110837637 A | 2/2020 |
| WO | 2019237860 A1 | 12/2019 |

OTHER PUBLICATIONS

CNIPA, First Office Action for Chinese Patent Application No. 202010224173.7, Mar. 6, 2023, 18 pages.
CNIPA, International Search Report for International Patent Application No. PCT/CN2020/081442, mailed Dec. 28, 2020, 4 pages.

* cited by examiner

ADVERSARIAL IMAGE GENERATION METHOD, COMPUTER DEVICE, AND COMPUTER-READABLE STORAGE MEDIUM

CROSS-REFERENCE TO RELATED APPLICATION(S)

This application is a continuation under 35 U.S.C. § 120 of International Application No. PCT/CN2020/081442, filed on Mar. 26, 2020, the entire disclosure of which is hereby incorporated by reference.

TECHNICAL FIELD

This disclosure relates to the technical filed of computers, and in particular to an adversarial image generation method, a computer device, and a computer-readable storage medium.

BACKGROUND

In recent years, with the rapid development of machine learning, classifiers based on deep neural networks (DNNs) have become very important supporting technologies in various industries. Offenders may use DNN classifiers to carry out malicious attacks on websites or applications, such as using DNN classifiers to automatically identify unlocking pictures to perform some illegal operations. Therefore, how to generate effective adversarial images to resist a target network of offenders has become an important research direction.

In existing adversarial attack methods, features of noise samples in the generated adversarial image are too obvious. When the target network adopts corresponding defense methods, the adversarial attack is difficult to achieve a desired effect, so the adversarial image will be difficult to resist malicious recognition of the target network, thus reducing security of the adversarial image.

SUMMARY

In a first aspect of the implementations of the present disclosure, an adversarial image generation method is provided. The method includes the following.

A reference model is generated according to a target classification model, where the reference model is classification-equivalent with the target classification model. A target image is obtained and an original noise for the target image is generated according to the reference model. A first noise and the original noise are input into an adversarial model and a second noise corresponding to the first noise is output when the adversarial model meets a convergence condition, where the second noise enhances an information entropy of the original noise. An enhanced noise image corresponding to the target image is generated according to the second noise and the target image, where a classification accuracy of the enhanced noise image in the target classification model is less than a classification accuracy of the target image in the target classification model.

Correspondingly, in a second aspect of the implementations of the present disclosure, a computer device is provided. The computer device includes a processor, a memory, and a network interface. The processor is coupled with the memory and the network interface. The network interface is configured to provide a data communication function. The memory is configured to store program codes. The processor is configured to invoke the program codes to execute the method in the implementations of the present disclosure.

Correspondingly, in a third aspect of the implementations of the present disclosure, a computer-readable storage medium is provided. The computer-readable storage medium stores program instructions which, when executed by a processor, cause the processor to execute the method in the implementations of the present disclosure.

BRIEF DESCRIPTION OF THE DRAWINGS

In order to explain the implementations of the present disclosure or the technical solutions in the related arts more clearly, the following will briefly introduce the drawings that need to be used in the description of the implementations or the related art. Obviously, the drawings in the following description are only some implementations of the present disclosure. For those of ordinary skill in the art, other drawings can be obtained based on these drawings without creative work.

DETAILED DESCRIPTION

The technical solutions in the implementations of the present disclosure will be clearly and completely described below in conjunction with the accompanying drawings in the implementations of the present disclosure. Obviously, the described implementations are only a part rather than all of the implementations of the present disclosure. Based on the implementations of the present disclosure, all other implementations obtained by those of ordinary skill in the art without creative work shall fall within the protection scope of the present disclosure.

In recent years, classifiers based on deep neural networks (DNNs) have become very important supporting technologies in various industries. In fields from face recognition to medical imaging-assisted diagnosis, as well as autonomous driving, DNN is an important component. Therefore, the safety issue of DNN has gradually aroused people's attention. Adversarial attack is a typical attack method against DNN. It refers to adding some faint noise to an image, which is hardly noticed by the human eye, but will drastically reduce an accuracy of the DNN classifier. Models in the present disclosure are all constructed based on DNN. At present, the reason why the adversarial attack is so effective is that the attacker already knows internal information about the target classification model, such as topology and neuron parameters, and then obtains the adversarial sample (that is, adversarial example) through a gradient ascent method. This method is called a white box attack and can be used to test robustness of the target classification model. But in practice, for those servers for which key information are unknown, this attack method becomes impossible because the model contains the structure and parameters of millions of neurons.

Figure 1:
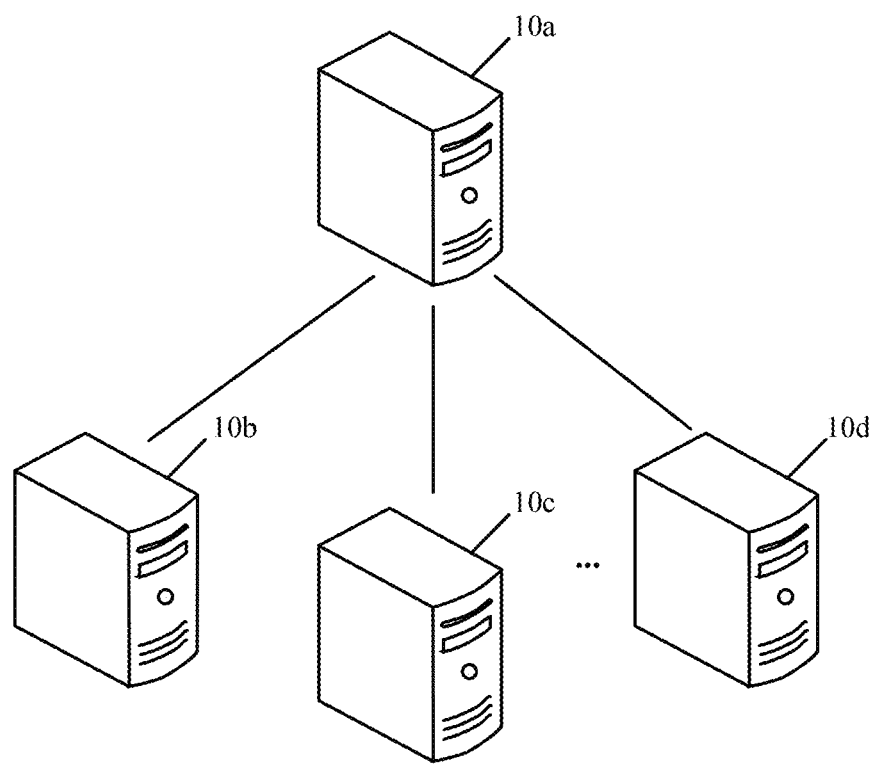
FIG. 1 is a schematic diagram illustrating a system architecture provided in implementations of the present disclosure.
Figure 2:
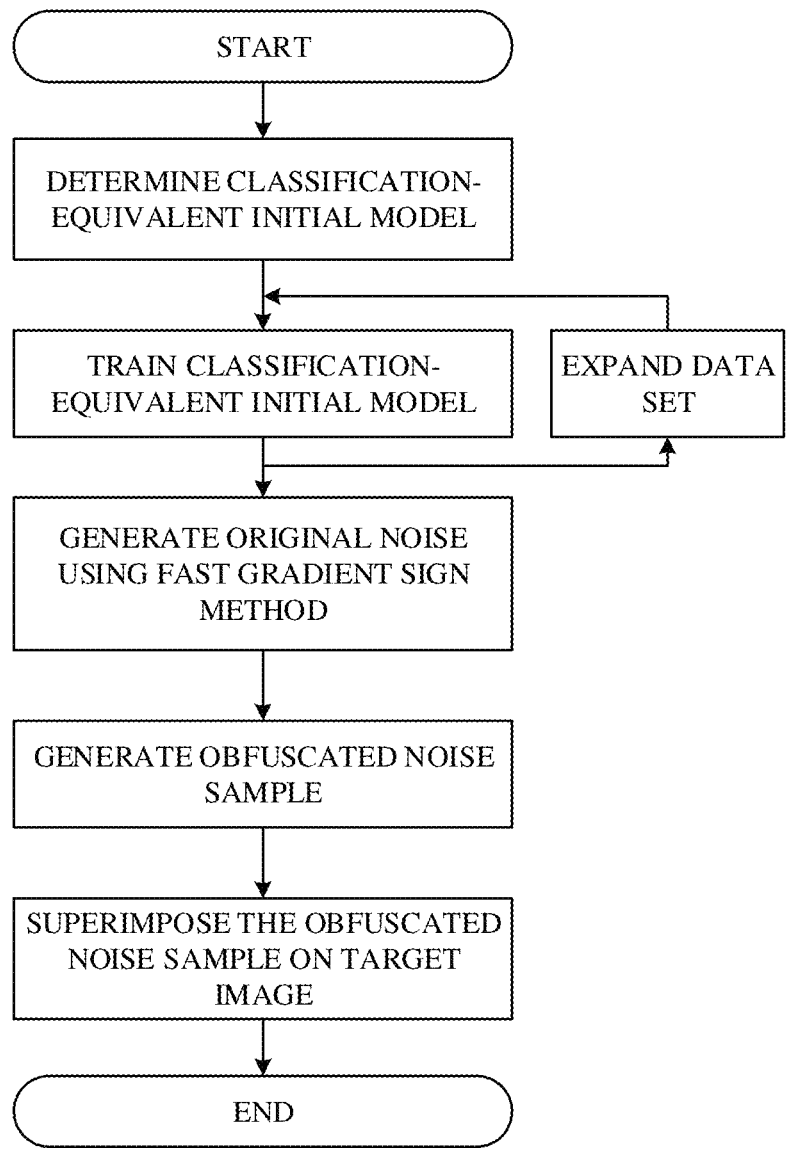
FIG. 2 is a schematic flowchart illustrating an adversarial image generation method provided in implementations of the present disclosure.

This disclosure proposes a black box attack method for DNN classifiers, which realizes an adversarial attack on the target classification model on the basis of ignorance of the internal structure and parameters of the target classification model. This is a truly practical attack mode. By disclosing this attack mode, follow-up research can also better improve the defense of DNN classifiers against adversarial examples attacks. FIG. 1 is a schematic diagram illustrating a system architecture provided in implementations of the present disclosure. As illustrated in FIG. 1, a user terminal cluster may include a server 10a, a server 10b, a server 10c, . . . , and a server 10d. The server 10a stores a target classification model, and the target classification model is a black box for other user terminals (such as the server 10b, the user terminal 10c, or the user terminal 10d). Take the server 10a and the server 10b as an example for description. When the server 10b wants to attack the target classification model in the server 10a, since the internal structure and parameters of the target classification model are unknown, a reference model that has equivalent classification functions with the target classification model is constructed, so as to perform black box attacks on the target classification model. FIG. 2 is a schematic flowchart illustrating an adversarial image generation method provided in implementations of the present disclosure. As illustrated in FIG. 2, the present disclosure may be divided into the following four parts.

(1) Determination of Classification-Equivalent Initial Model

The target classification model is a black box for the server 10b. The server 10b has no knowledge of internal information of the model and data for training the model. The only information that can be obtained is output category labels corresponding to input data. Therefore, the server 10b can construct a reference model that is classification-equivalent to the target classification model according to some prior knowledge and output information of the target classification model. The more complex the deep neural network, the stronger the fitting ability of the deep neural network. That is to say, a relatively large-scale neural network (can be one neural network, or several neural networks combined into a model) to fit the target classification model to be attacked. There are many neural networks for classification tasks, such as AlexNet, VGGNet, ResNet, or fully convolutional network (FCN) in convolutional neural network (CNN). The server 10b can select, from existing classifiers, a classification-equivalent initial model as the reference model according to classification results of the target classification model.

(2) Determination of Reference Model

Given an initial training set generated randomly, the initial training set is input into the target classification model as a test set, so as to obtain an output training set corresponding to the initial training set. Then the initial training set is used as training samples, the output training set is used as sample labels, and the classification-equivalent initial model of the target classification model is trained with the training samples and the sample labels in combination of a traditional training manner. In order to better learn a decision boundary of the target classification model, the server 10b needs to continuously repeat the training process with different input-output pairs (i.e., training samples and sample labels). However, a large number of query operations on the target classification model will be detected by a defense system. Therefore, in order to reduce the number of query operations and maximize the learning of the decision boundary of the target classification model, the server 10b may use a Jacobian matrix to expand the initial training set. With a large number of training samples, the server 10b can train the classification-equivalent initial model to generate the reference model.

(3) Generation of Original Noise Using Fast Gradient Sign Method (FGSM)

When the aforementioned reference model is generated, the server 10b can use internal information of the reference model to replace internal information of the target classification model in the server 10a. In an attack process, it is desirable to add some tiny noise to the target image, so as to cause the target classification model to make a wrong classification decision, but the human eye cannot see the difference between the target image with and without noise. These noise samples can be obtained by a gradient ascent method. Because in a training process of a DNN-based classifier, technicians always use a gradient descent method to minimize a loss function of the classifier, thereby obtaining a classifier with high accuracy, when the noise samples generated by the gradient ascent method are added to the target image, the loss function of the target classification model will increase, thereby leading to a misclassification.

(4) Generation of Obfuscated Adversarial Sample

The adversarial sample produced by the FGSM depends on gradient information of the reference model. When the reference model is generated, the gradient information is equivalent to a constant. In this case, gradient features in the original noise are too obvious, so that the adversarial sample (i.e., original noise+target image) generated according to the original noise can easily be found and cleared by the defense system in the target classification model. The present disclosure first obfuscates gradient information in the original noise, and when the adversarial sample attacks the target classification model or is recognized by the target classification model, a success rate of the attack will be greatly improved. The most direct way to obfuscate features is to increase an information entropy of the noise. In the present disclosure, a generative adversarial model is used to obfuscate the original noise generated by the fast gradient sign method, and finally the obfuscated noise sample is added to the target image to generate an obfuscated adversarial sample. In this way, a recognition accuracy of the target image in the above-mentioned target classification model is reduced without affecting recognition by the human eye. Similarly, when the second noise for the important image is added to the image, it will be difficult for the malicious target classification model to identify the important image, thus ensuring data security.

The user terminal cluster may include a mobile phone, a tablet computer, a laptop, a handheld computer, a smart speaker, a mobile internet device (MID), a point of sales (POS) machine, a wearable device (such as a smart watch, a smart Bracelet, etc.), etc.

Figure 3:
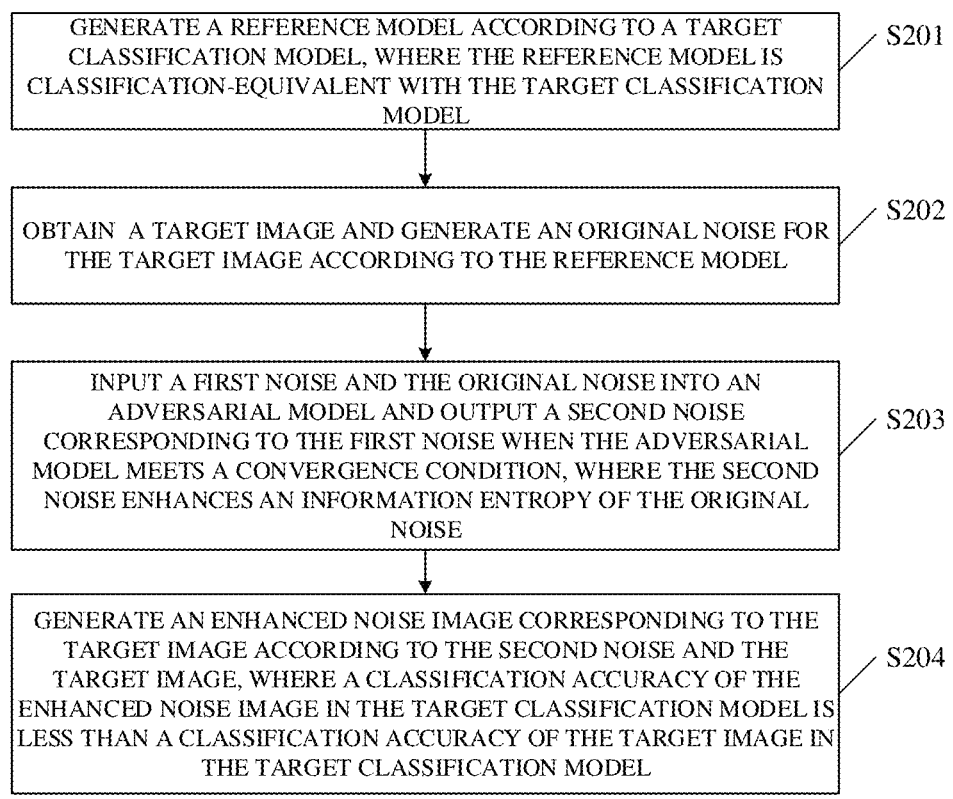
FIG. 3 is a schematic flowchart illustrating an adversarial image generation method provided in implementations of the present disclosure.

FIG. 3 is a schematic flowchart illustrating an adversarial image generation method provided in implementations of the present disclosure. As illustrated in FIG. 3, the adversarial image generation method includes the following.

At S201, a reference model is generated according to a target classification model, where the reference model is classification-equivalent with the target classification model.

Specifically, according to the target classification model, a sample image set and at least two sample models are determined. Target classification information corresponding to the sample image set is determined according to the target classification model. A cross entropy between each of at least two pieces of predicted classification information and the target classification information is calculated to obtain at least two cross entropies. A minimum cross entropy among the at least two cross entropies is determined, and a sample model to which predicted classification information corresponding to the minimum cross entropy belongs is determined as the classification-equivalent initial model. A first tensor set is obtained and the first tensor set is input into the target classification model to obtain an output tensor set corresponding to the first tensor set. The first tensor set is used as a training sample and the output tensor set is used as a sample label, and the training sample and the sample label are input into the classification-equivalent initial model. A predicted label corresponding to the training sample is obtained according to the classification-equivalent initial model. The classification-equivalent initial model is trained according to the predicted label and the sample label until a model loss value is less than a model loss threshold, and the trained classification-equivalent initial model is determined as the reference model, where the model loss value is generated based on the predicted label and the sample label.

As is well known, the more neurons the DNN (deep neural network) has, the more information it can store. Therefore, a large-scale complex network can be used to simulate a small-scale simple network. In addition, considering that many applications may choose one of some well-known DNN classification neural networks as their own classifier (for example, AlexNet, GoogLeNet, ResNet, etc.), so technicians can collect typical classifiers to build a database of classification-equivalent models, and then select an initial structure of the reference model, that is, the classification equivalent initial model, from this database based on the classification effect.

Figure 4A:
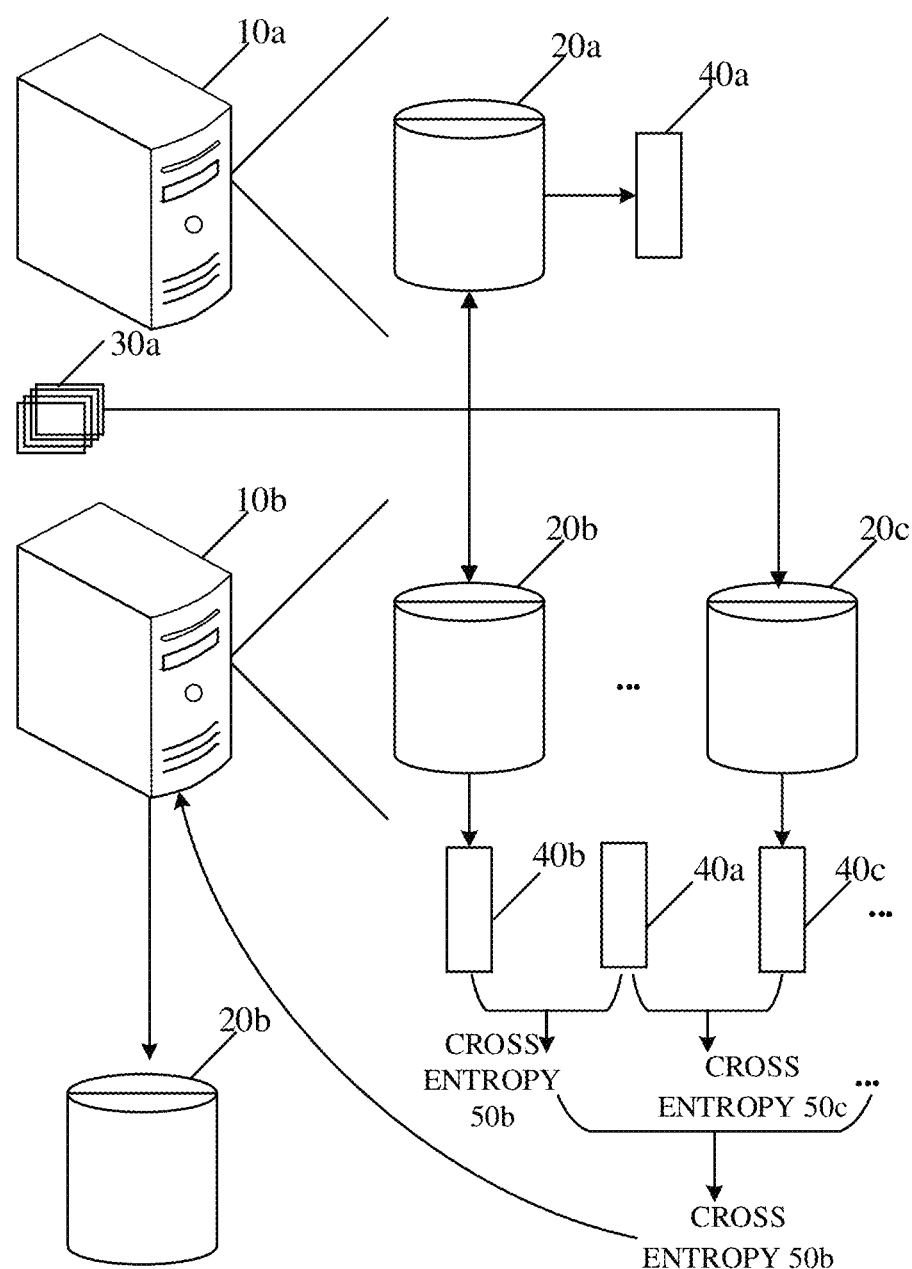
FIG. 4a is a schematic diagram illustrating a scenario for generation of a reference model provided in implementations of the present disclosure.

FIG. 4a is a schematic diagram illustrating a scenario for generation of the reference model provided in implementations of the present disclosure. If the server 10b wants to attack the target classification model 20a in the server 10a, the server 10b first needs to clarify a classification function of the target classification model 20a. For black box attack (because the server 10b has no knowledge of internal structure information of the target classification model 20a), it is very difficult to obtain parameter information of millions of neurons. However, the server 10b can generate a model with a known structure to replace the black box model. As long as these two models have the same output (for example, classification label) for the same input vector or image, that is to say, the two models have similar performance in terms of functions, the model with the known structure can be regarded as a classification-equivalent model of the black box model. Then the classification-equivalent model can be used as the reference model, and the adversarial samples that can make the reference model misclassify will also make the target classification model 20a misclassify.

The reference model may not be determined arbitrary. Firstly, a model database may be constructed according to classification functions of the target classification model 20a. As illustrated in FIG. 4a, the model database in the server 10b may include a sample model 20b, and a sample model 20c. The server 10b may obtain a public image set for the target classification model 20a on a website, and target classification information 40a output by the target classification model 20a for a test image set in the public image set 30a. The sample model 20b, . . . , the sample model 20c are trained according to a training image set in the public image set. After training, the test image set 30a (that is, sample image set) is input into the sample model 20b, . . . , and the sample model 20c respectively, so as to obtain predicted classification information 40b output by the sample model 20b for the test image set 30a, . . . , classification information 40c output by the sample model 20c for the test image set 30a.

The server 10b selects the classification-equivalent initial model similar to the target classification model 20a by calculating a cross entropy 50b between the predicted classification information 40b and the target classification 40a, . . . , and a cross entropy 50c between the predicted classification information 40c and the target classification 40a, as shown in equation (1):

$$H(p_{bb}, q_{mod}) = -\Sigma_{i=1}^{n} p_{bb}(x_i) \text{Log}(q_{mod}(x_i)) \quad (1)$$

where x represents the test image set 30a, n represents a category of a classification label of the target classification model 20a, $P_{bb}$ represents probability distribution corresponding to the target classification information 40a, and $q_{mod}$ represents probability distribution corresponding to the predicted classification information (including the predicted classification information 40b and the classification information 40c) output by the sample model (including the sample model 20b and the sample model 20c). After calculating cross entropies between all sample models in the model database and the target classification model 20a, a sample model with the minimum cross entropy, denoted as F, is selected as the classification-equivalent initial network, as shown in equation (2), which is used for subsequent training to generate the reference model:

$$F = \arg \min_{mod} H(p_{bb}, q_{mod}) \quad (2)$$

By calculating the cross entropy between each of at least two pieces of predicted classification information and the target classification information 40a, as illustrated in FIG. 4a, the cross entropy 50b is the minimum entropy of the at least two cross entropies, and therefore the sample model 20b is used as the classification-equivalent initial model.

Figure 4B:
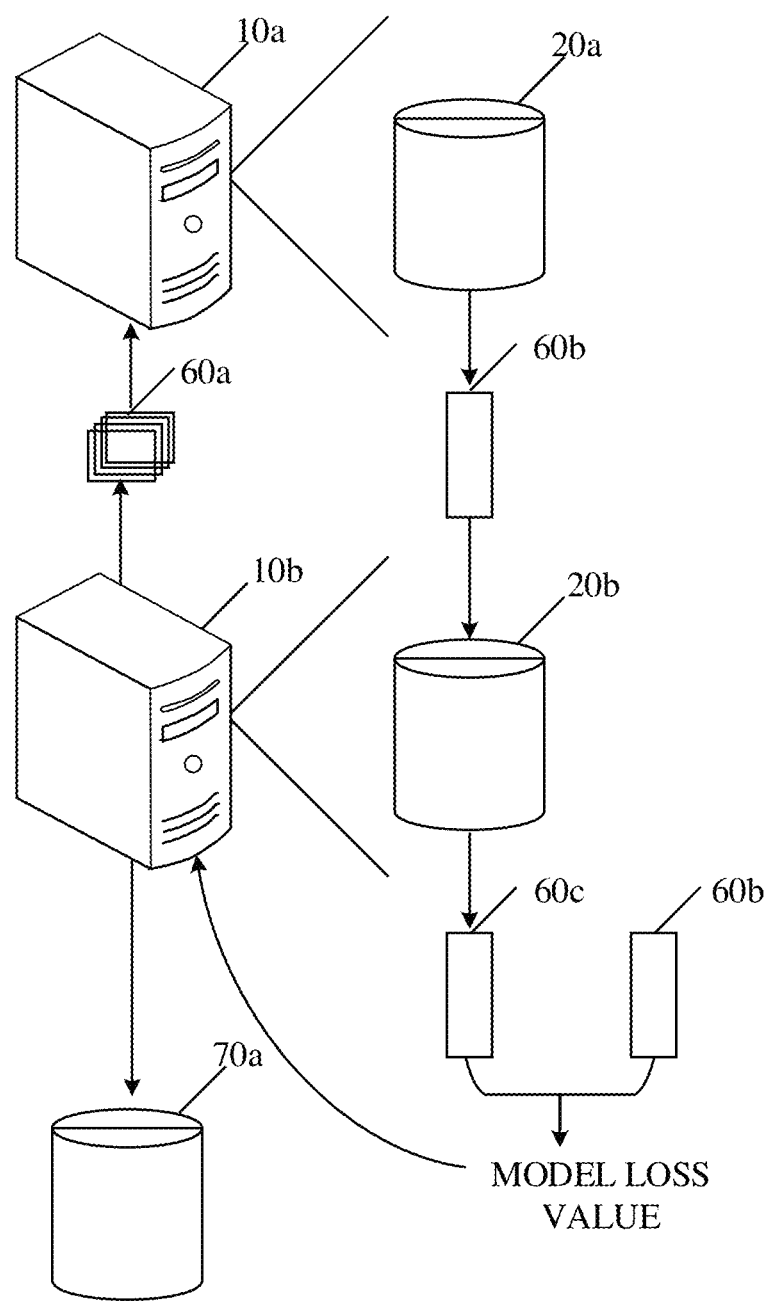
FIG. 4b is a schematic diagram illustrating a scenario for generation of a reference model provided in implementations of the present disclosure.

Further, FIG. 4b is a schematic diagram illustrating a scenario for generation of a reference model provided in implementations of the present disclosure. The server 10b randomly generates a first tensor set 60a, and inputs the first tensor set 60a as a test set into the target classification model 20a, so as to obtain an output tensor set 60b corresponding to the first tensor set 60a. That is, the server 10b can label each input tensor in the first tensor set 60a by querying the output of the target classification model 20a for the first tensor set 60a. The first tensor set 60a is used as a training sample, the output tensor set 60b is used as a sample label, and the training sample and sample label are input into the classification-equivalent initial model 20b. According to the classification-equivalent initial model 20b, a predicted label 60c corresponding to the training sample is obtained. The classification-equivalent initial model 20b is trained according to the predicted label 60c and the sample label 60b. In order to better learn a decision boundary of the target classification model 20a (which can also be understood as internal structural information of the target classification model 20a), the server 10b may continuously repeat training of the classification-equivalent initial model 20b using a large number of training samples and sample labels. However, a large number of query operations on the target classification model 20a will be detected by a defense system of the model. Therefore, in order to reduce the number of query operations and maximize the learning of the decision boundary of the target classification model 20a, the server 10b may use a Jacobian matrix to expand the first tensor set 60a. The classification-equivalent initial model 20b is defined by equation (3), where $R^n \rightarrow R^m$ completes mapping from a n-dimensional pixel vector $\vec{x}$ to a m-dimensional discrete label set $\vec{y}$, and then the Jacobian matrix of F can be expressed as:

$$J_F(x_1, ..., x_n) = \begin{bmatrix} \frac{\partial y_1}{\partial x_1} & \cdots & \frac{\partial y_1}{\partial x_n} \\ \vdots & \ddots & \vdots \\ \frac{\partial y_m}{\partial x_1} & \cdots & \frac{\partial y_m}{\partial x_n} \end{bmatrix} \quad (3)$$

The above Jacobian matrix describes sensitivity directions of the output of the classification-equivalent initial model 20b to the input $\vec{x}$. If the input data is adjusted along these directions (that is, along the gradient direction), the server 10b can quickly detect the decision boundary of the target classification model 20a. The expansion of training samples using the Jacobian matrix can be expressed in equation (4):

$$D_{t+1} = \{\vec{x} + \lambda \text{Sgn}(J_F[\vec{y}]) : \vec{x} \in D_t\} \cup D_t, \ t=0,1 \ldots k \quad (4)$$

where $\lambda \text{sgn}(J_F[\vec{y}])$ represents a gradient sign of the classification-equivalent initial model 20b, which represents positive/negative/zero gradient of the classification label corresponding to the training sample. The server 10b may add tiny noise with an amplitude of λ to the first tensor set 60a along the gradient direction. The obtained training sample and the original training sample $D_t$ form a new training sample $D_{t+1}$. Finally, after k rounds of training sample expansion, the decision boundary of the target classification model 20a can be well detected by using the training samples to train the classification-equivalent initial model 20b. For example, a model loss value of each round is calculated, and when the model loss value is greater than the model loss threshold, the Jacobian matrix is executed one time. Then the classification-equivalent initial model 20b is trained according to the new training sample, until the model loss value is less than the model loss threshold. Finally, the trained classification-equivalent initial model 20b is determined as the reference model 70a. The model loss value is generated based on the predicted label 60c and the sample label 60b.

At S202, a target image is obtained and an original noise for the target image is generated according to the reference model.

Specifically, gradient information of the target image in the reference model is determined according to model structure information of the reference model. A disturbance factor is obtained and the original noise for the target image is generated according to the gradient information and the disturbance factor.

Referring to FIG. 4a and FIG. 4b, after the above operations, the server 10b obtains the reference model 70a of the target classification model 20a. The output of the reference model 70a is denoted as F: $R^n \rightarrow \{1 \ldots m\}$, that is, given input data $\vec{x} \in R^n$, the output label is $\tilde{y} \in \{1 \ldots m\}$, and a loss function of the reference model 70a is denoted as $L(\theta, \vec{x}, \vec{y})$. The attacker may add small disturbance $\vec{r}$ to the target image to achieve the effect as shown in equation (5):

$$F(\vec{x}) = \vec{y}; \ F(\vec{x} + \vec{r}) \neq \vec{y} \quad (5)$$

The server 10b may use the fast gradient sign method (FGSM) to generate a fast noise sample. The main idea of this method is to find a direction where the gradient of reference model 70a based on the target image changes most, and add the disturbance to pixels in the target image along the gradient direction. The changed direction can be expressed with the Jacobian matrix, as shown in equation (6):

$$J_F(x_1, ..., x_n) = \begin{bmatrix} \frac{\partial L}{\partial x_1} & \frac{\partial L}{\partial x_2} & \cdots & \frac{\partial L}{\partial x_n} \end{bmatrix} \quad (6)$$

It should be noted that the Jacobian matrix in equation (3) represents a direction of maximum change in the gradient of the output to the input of the classification-equivalent initial model 20b, and the Jacobian matrix in equation (6) represents a direction of maximum change in the gradient of the model structure information to the input in case of the defined reference model 70a.

Figure 5:
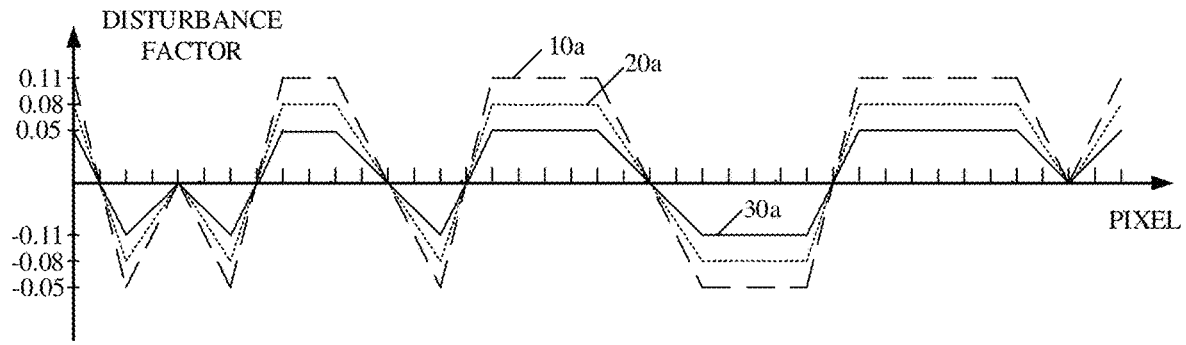
FIG. 5 is a schematic diagram illustrating some pixels in a fast noise sample provided in implementations of the present disclosure.

Then the reference model may obtain the fast noise sample for the target image according to equation (7):

$$\vec{r} = \varepsilon \text{sgn}(\nabla_{\vec{x}} L(\theta, \vec{x}, \vec{y})) \quad (7)$$

where ε is the disturbance factor that affect accuracy of the target classification model 20a when the server 10b attacks. The larger the disturbance factor, the greater the noise of the adversarial sample (i.e., fast noise sample+target image), and the more obvious the attack effect, but at the same time the greater the possibility of being perceived by humans. However, the fast noise sample largely depends on the gradient direction of the reference model 70a. The gradient direction is constant when training of the classification-equivalent initial model 20b is completed, so the fast noise sample will show the gradient feature to some extent. FIG. 5 is a schematic diagram illustrating some pixels in a fast noise sample provided in implementations of the present disclosure. As illustrated in FIG. 5, when ε takes 0.11, 0.08, and 0.05, the corresponding gradient curve 10a, gradient curve 20a, and gradient curve 30a have very obvious gradient features with respect to the reference model 70a, which can be easily found and further eliminated by the target classification model 20a.

As mentioned above, if the fast noise sample is produced by the fast gradient symbol method, it is easy to extract the gradient features of the fast noise sample during the adversarial training. The server 10b can increase the information entropy of the fast noise sample to obfuscate the gradient features of the noise sample, forcing the defense system of the target classification model 20a to pay a greater price to learn these features.

The information entropy of each pixel in the fast noise sample can be expressed in equation (8):

$$H_{fast\_noise\_pix} = -\sum_{i=1}^{\mu} \frac{1}{\mu} \log\left(\frac{1}{\mu}\right) = \log\mu \quad (8)$$

where $\varepsilon$ is a random variable, and $\mu$ represents the number of values of the random variable $\varepsilon$. Only when the values of $\varepsilon$ have independently identically distribution, can the maximum $H_{fast\_noise\_pix}$ be obtained, as expressed in equation (9):

$$\mathrm{argmax} H_{fast\_noise\_pix} = -\sum_{i=1}^{\mu} \frac{1}{\mu} \log\left(\frac{1}{\mu}\right) = \log\mu \quad (9)$$

The value of $H_{fast\_noise\_pix}$ is independent of the specific value of the disturbance factor. Therefore, regardless of the value of the disturbance factor, the feature of the fast noise sample is very obvious. The simplest way to increase the noise entropy of the fast noise sample is to increase $\mu$, that is, to increase the number of values of $\varepsilon$. Therefore, in this disclosure, $\varepsilon$ is a random variable taking values of $[\varepsilon_1, \varepsilon_2 \ldots \varepsilon_{k\mu}]$ with equal probability, rather than a constant. The maximum information entropy of each pixel in the fast noise sample can be expressed in equation (10):

$$\mathrm{argmax} H_{fuzzy\_noise\_pix} = -\sum_{i=1}^{\mu} \frac{1}{k\mu} \log\left(\frac{1}{k\mu}\right) = \log k\mu \quad (10)$$

An increment of the information entropy of each pixel value can be expressed as:

$$\Delta H_{noise\_pix} = H_{fuzzy\_noise\_pix} - H_{fast\_noise\_pix} \quad (11)$$

In order to simplify the calculation, the maximum information entropy can be used to estimate the increment:

$$\Delta H_{noise\_pix} \approx H_{fuzzy\_noise\_pix} - H_{fast\_noise\_pix} = \log k\mu - \log\mu = \log k \quad (12)$$

If the given fast noise sample has n pixels, the total entropy increment will be:

$$\Delta H_{noise} = n \log k \quad (13)$$

At last, with the increase of the information entropy, the fast noise sample becomes more and more obfuscated, and the original noise for the target image is generated.

At S203, a first noise and the original noise are input into an adversarial model and a second noise corresponding to the first noise is output when the adversarial model meets a convergence condition, where the second noise enhances an information entropy of the original noise.

Specifically, the adversarial model includes a generation model and a discrimination model. A sample generation model and a sample discrimination model are obtained. A predicted generated noise corresponding to the first noise is generated according to the sample generation model. The sample discrimination model is trained according to the predicted generated noise and the original noise to obtain the discrimination model. The sample generation model is trained according to the discrimination model and the predicted generated noise until a noise matching degree output by the discrimination model is greater than a noise matching degree threshold, and the trained sample generation model is determined as the generation model. The noise matching degree represents the noise matching degree between the original noise and the predicted generated noise. A predicted enhanced noise generated for the first noise by the generation model is determined as the second noise.

Figure 6:
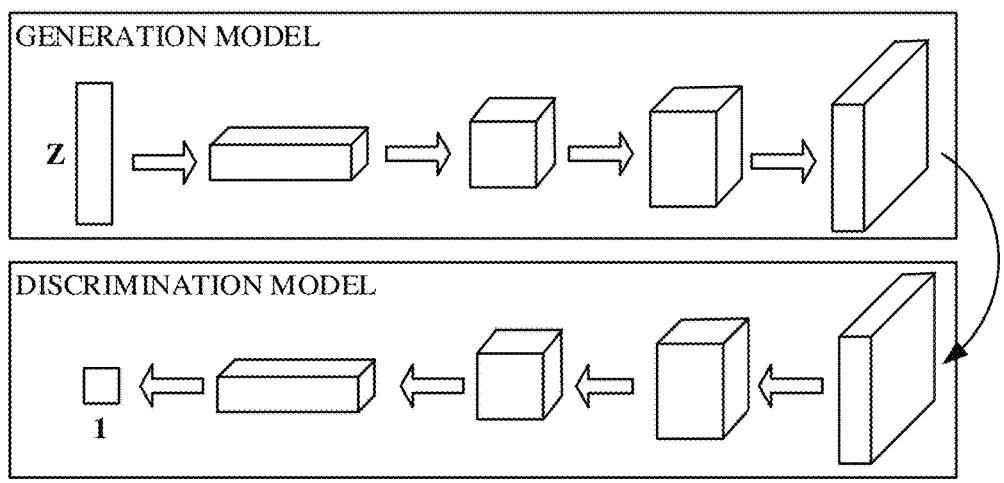
FIG. 6 is a schematic structural diagram of an adversarial model provided in implementations of the present disclosure.

The original noise obtained at step S103 is not enough to cover the gradient feature of the fast noise sample. A better method is to make the disturbance factor randomly distributed, and an adversarial model can be established to learn and reproduce the random distribution, so as to generate the second noise, that is, the second noise is the noise that enhances the information entropy of the original noise. FIG. 6 is a schematic structural diagram of an adversarial model provided in implementations of the present disclosure. The adversarial model includes a generation model and a discrimination model. For the generation model, the input is the first noise z, and the output is the predicted generated noise. The generation model in this disclosure can be any deep neural model, such as a convolutional neural network, a fully convolutional neural network, and so on. The discrimination model is a common discriminator, where the input is noise and the output is a true or false label of the noise. For example, the label "1" represents that the noise is the original noise, and label "0" represents that the noise is the predicted generated noise. Actually, the noise input into the discrimination model is the predicted generated noise. When the output of the discrimination model is label "1", it means that the noise generated by the generation model is close to the original noise, so that it can fool the discrimination model and make it determine the noise as the original noise.

Figure 7:
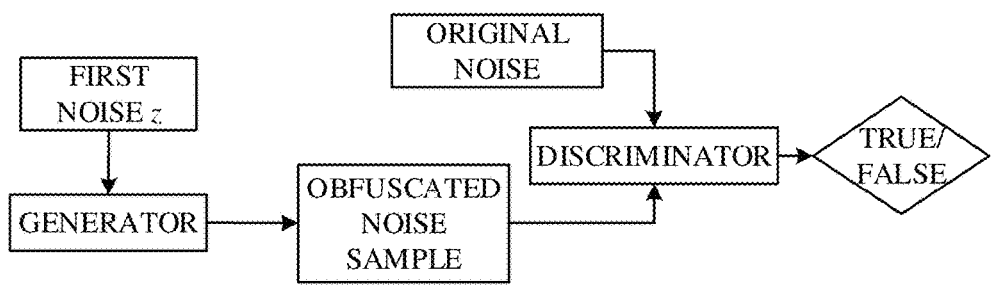
FIG. 7 is a schematic diagram illustrating a scenario for training a sample adversarial model provided in implementations of the present disclosure.

To obtain the second noise that is very close to the original noise and enhances the information entropy of the original noise, it is necessary to train the sample generation model and the sample discrimination model. FIG. 7 is a schematic diagram illustrating a scenario for training a sample adversarial model provided in implementations of the present disclosure. As illustrated in FIG. 7, the first noise z is first input into a generator (that is, the sample generation model). After convolution and pooling operations in the generator, the predicted generated noise of the first noise z is output. Using the predicted generated noise as a false noise sample, and using the original noise as a true noise sample, a discriminator (that is, the sample discrimination model) is trained to accurately discriminate the true noise sample and the false noise sample, and then a discrimination model is obtained. When the discrimination model is determined, the above predicted noise sample is used as the true noise sample and input into the discrimination model. At this time, the discrimination model will generate the noise matching degree based on the predicted noise sample and the original noise. When the noise matching degree is less than a noise matching degree threshold, the discrimination model will feed back the noise matching degree to the sample generation model, and then adjust internal structure parameters of the sample generation model to generate a new predicted noise sample to input into the discrimination model, until the noise matching degree output by the discrimination model is greater than the noise matching degree threshold. The trained sample generation model is determined as the generation model. In this case, the adversarial model determines the predicted enhanced noise generated for the first noise by the generation model as the second noise, that is, the obfuscated noise sample in FIG. 7.

At S204, an enhanced noise image corresponding to the target image is generated according to the second noise and the target image, where a classification accuracy of the enhanced noise image in the target classification model is less than a classification accuracy of the target image in the target classification model.

Specifically, according to a noise vector of the second noise, the target image is converted into a target image vector having a same dimension as the noise vector. A value $P_i$ in the noise vector is obtained and a value $Q_i$ in the target image vector is obtained, where i is a positive integer less than or equal to N, N is the number of dimensions of the noise vector or the target image vector, $P_i$ is a value corresponding to the i-th dimension of the noise vector, and $Q_i$ is a value corresponding to the i-th dimension of the target image vector. The value $P_i$ is added to the value $Q_i$ to generate a value $R_i$. The enhanced noise image having a same dimension as the target image is generated according to the value $R_i$.

The obfuscated noise sample (the second noise) is added into the target image to generate an obfuscated adversarial sample (the enhanced noise image), as expressed in equation (14):

$$\vec{x}_{fuzzy\_advexample} = \vec{x} + \vec{r}_{fuzzy} \qquad (14)$$

Figure 8:
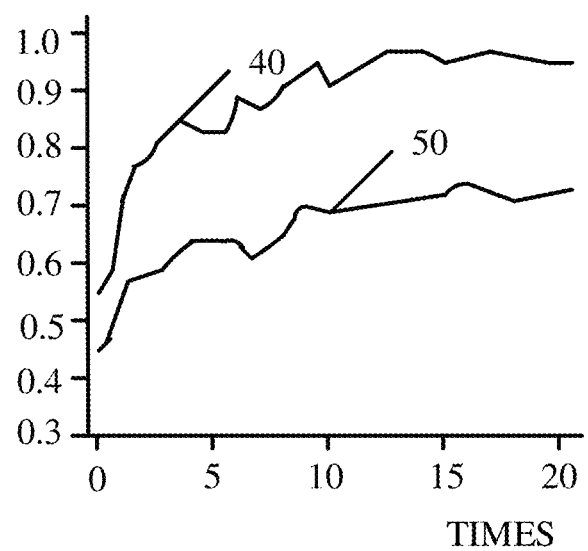
FIG. 8 is a schematic diagram illustrating comparison of training accuracies provided in implementations of the present disclosure.

The enhanced noise image may mislead the target classification model to make a wrong classification result, and will not be easily discovered and cleared by the adversarial training in the target classification model. FIG. 8 is a schematic diagram illustrating comparison of training accuracies provided in implementations of the present disclosure. As illustrated in FIG. 8, curve 40 represents an accuracy corresponding to the target image, and curve 50 represents an accuracy corresponding to the enhanced noise image. As the number of training rounds increases, the classification accuracy of the reference model on the target image is getting higher and higher, and finally reaches about 97%. However, the classification accuracy of the reference model on the enhanced noise image is much inferior, and the final classification accuracy is only about 73%. It can be proved that the enhanced noise image is effective in attacking the black box network (i.e., target classification model).

Figure 9:
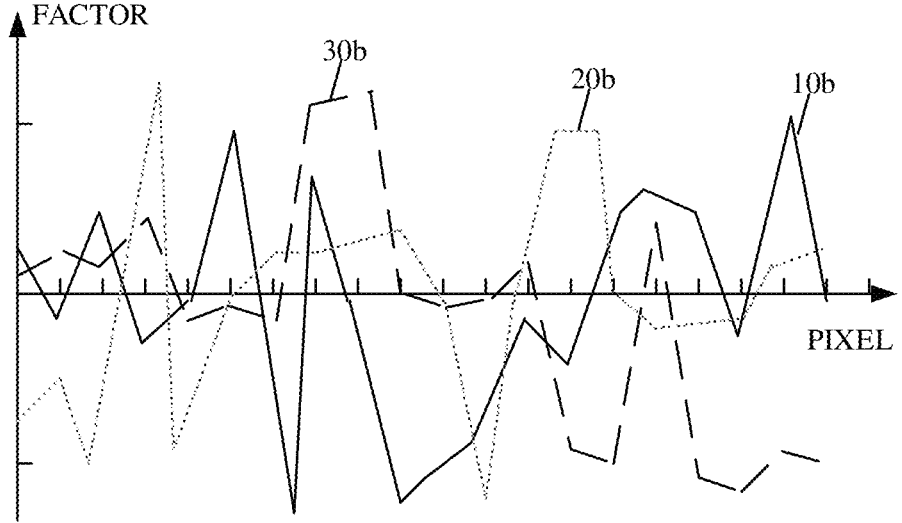
FIG. 9 is a schematic diagram illustrating some pixels in an enhanced noise image provided in implementations of the present disclosure.

Further, FIG. 9 is a schematic diagram illustrating some pixels in an enhanced noise image provided in implementations of the present disclosure. As illustrated in FIG. 9, the disturbance factor c corresponding to the gradient curve 10b, the disturbance factor corresponding to the gradient curve 20b, and the disturbance factor c corresponding to the gradient curve 30b are all different, and these three disturbance factors follow a random distribution. Referring also to FIG. 5, these two figures are in sharp contrast. The gradient value of each pixel in the enhanced noise image has no rules to follow, which is a good proof of the word "obfuscated", which undoubtedly increases the difficulty in defense work of the target classification model.

Figure 10A:
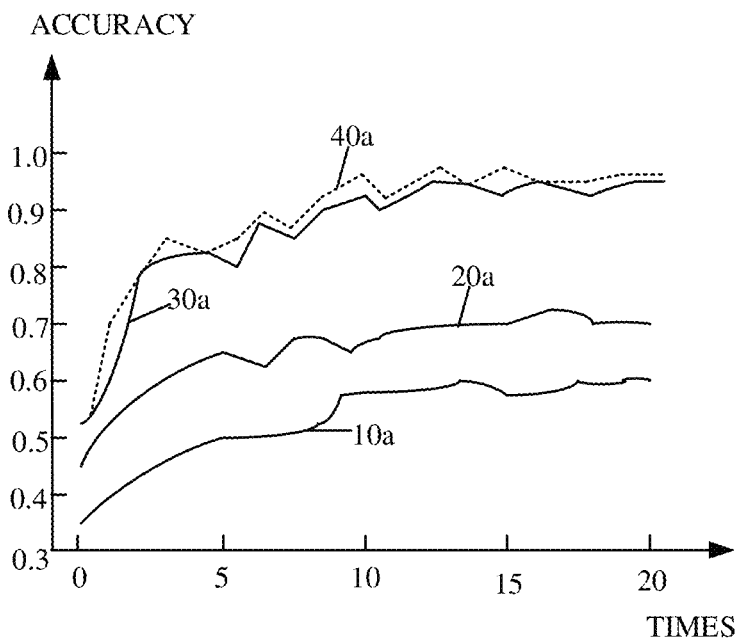
FIG. 10a is a schematic diagram illustrating comparison of training accuracies provided in implementations of the present disclosure.
Figure 10B:
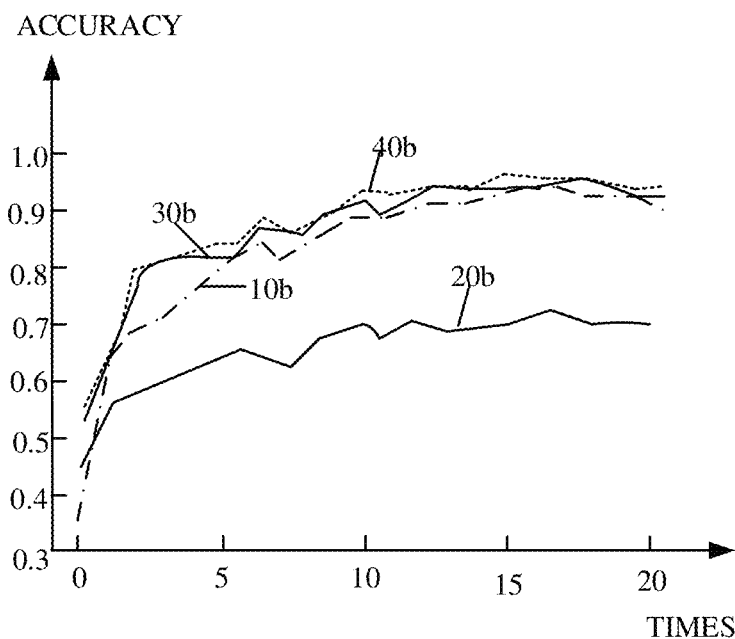
FIG. 10b is a schematic diagram illustrating comparison of training accuracies provided in implementations of the present disclosure.

Further, FIG. 10a is a schematic diagram illustrating comparison of training accuracies provided in implementations of the present disclosure. FIG. 10a shows test results before the adversarial training of the reference model, where curve 10a represents the accuracy curve of the target image with the original noise for different training times, curve 20a represents the target image with the second noise (i.e., the enhanced noise image) for different training times, curve 30a represents the accuracy curve of the target image with random noise for different training times, and curve 40a represents the accuracy curve of the target image for different training times. It can be seen from the comparison that an attack effect of the original noise on the reference model is better than an attack effect of the obfuscated adversarial example (that is, the second noise) on the reference model. Further, FIG. 10b is a schematic diagram illustrating comparison of training accuracies provided in implementations of the present disclosure. FIG. 10b shows test results after the adversarial training of the reference model, where curve 10b represents the accuracy curve of the target image with the original noise for different training times, curve 20b represents the target image with the second noise (i.e., the enhanced noise image) for different training times, curve 30b represents the accuracy curve of the target image with random noise for different training times, and curve 40b represents the accuracy curve of the target image for different training times. Apparently, after adversarial training, although the accuracies of the reference model are improved on the target image with the original noise and the target image with the second noise, the attack effect of the target image with the original noise is significantly weaker, while the target image with the second noise can also maintain a considerable attack effect. In addition, from the random noise represented by the curve 30b, it can be seen that the impacts of the random noise on the reference model have no difference before and after the adversarial training. This can show that the obfuscated noise sample (i.e., the second noise) is essentially different from the ordinary random noise.

Figure 11:
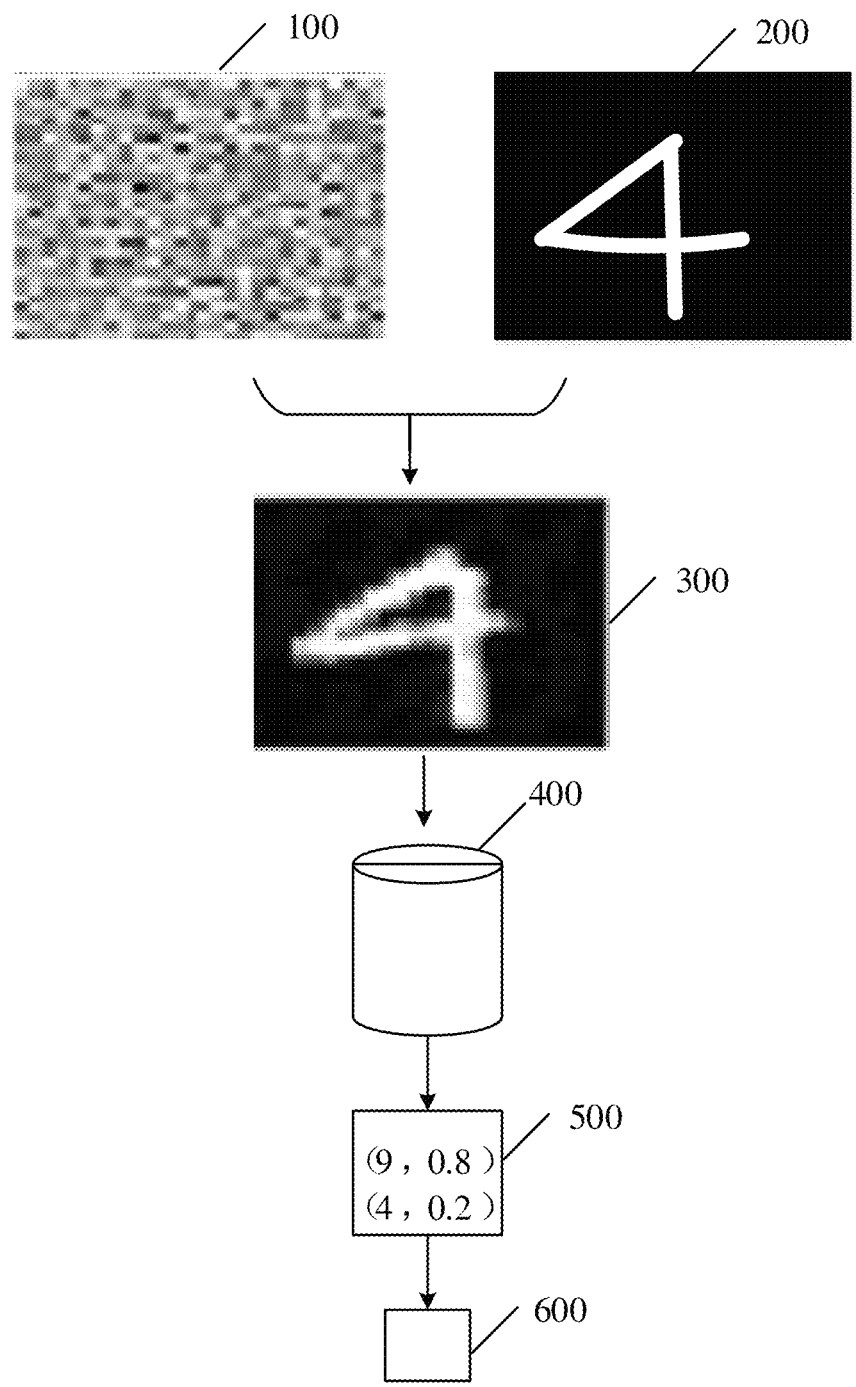
FIG. 11 is a schematic diagram illustrating a scenario for image recognition provided in implementations of the present disclosure.

Further, FIG. 11 is a schematic diagram illustrating a scenario for image recognition provided in implementations of the present disclosure. As illustrated in FIG. 11, the target image 200 shows a handwritten number "4". The reference model 400 is constructed according to an illegal model, that is, the illegal model is the target classification model. The construction of the reference model 400 can be referred to the implementations in FIG. 3, which will not be repeated herein. The offenders may identify images in respective applications using the illegal model, and attacks the applications according to the obtained image information to crash the corresponding network. The defenders obtains the second noise 100 for the target image 200 using the adversarial model, and superimposes pixels of the second noise 100 and the target image 200, so as to generate the enhanced noise image 300 for the target image 200. It can still be determined by the human eye that the handwritten number in the enhanced noise image 300 is "4". When the reference model 400 obtains the above-mentioned enhanced noise image 300, classification information 500 for the enhanced noise image 300 is generated. As illustrated in FIG. 11, when the reference model 500 is used for classification, the reference model 500 determines that the probability of the enhanced noise image 300 being "9" is 0.8, and the probability of the enhanced noise image 300 being "4" is 0.2. The final output information 600 is "9". That is, when the reference model 400 classifies the above-mentioned enhanced noise image 300, an incorrect classification result is generated. This indicates that the illegal model will also generate the incorrect classification result. Therefore, the recognition accuracy of illegal model can be reduced and data security can be ensured.

According to the implementations of the present disclosure, the reference model that is classification-equivalent with the target classification model is generated according to the target classification model. The target image is obtained and the original noise for the target image is generated according to the reference model. The first noise and the original noise are input into the adversarial model and the second noise corresponding to the first noise is output when the adversarial model meets the convergence condition, where the second noise enhances the information entropy of the original noise. The enhanced noise image corresponding to the target image is generated according to the second noise and the target image, where the classification accuracy of the enhanced noise image in the target classification model is less than the classification accuracy of the target image in the target classification model. From the above, by constructing the reference model (white box model) that is function-equivalent with the target classification model (black box model), the original noise for the target image can be generated. On the basis of the above-mentioned original noise, the noise information entropy of the original noise is increased through the adversarial model to obtain the second noise, that is, the obfuscated adversarial example, which brings huge challenges to the traditional defense method. In addition, the obfuscated adversarial examples produced by the adversarial model are endless, and a large number of obfuscated adversarial samples further increase the difficulty of defense work. The second noise and the target image are superimposed to obtain the enhanced noise image, where changes in the enhanced noise image are not easy to be noticed by human eyes, but the target classification model cannot accurately classify the enhanced noise image, that is, the accuracy of the target classification model is reduced. In the same way, when the second noise for the important image is added to the image, the illegal target classification model cannot identify the important image, which ensures data security.

Figure 12:
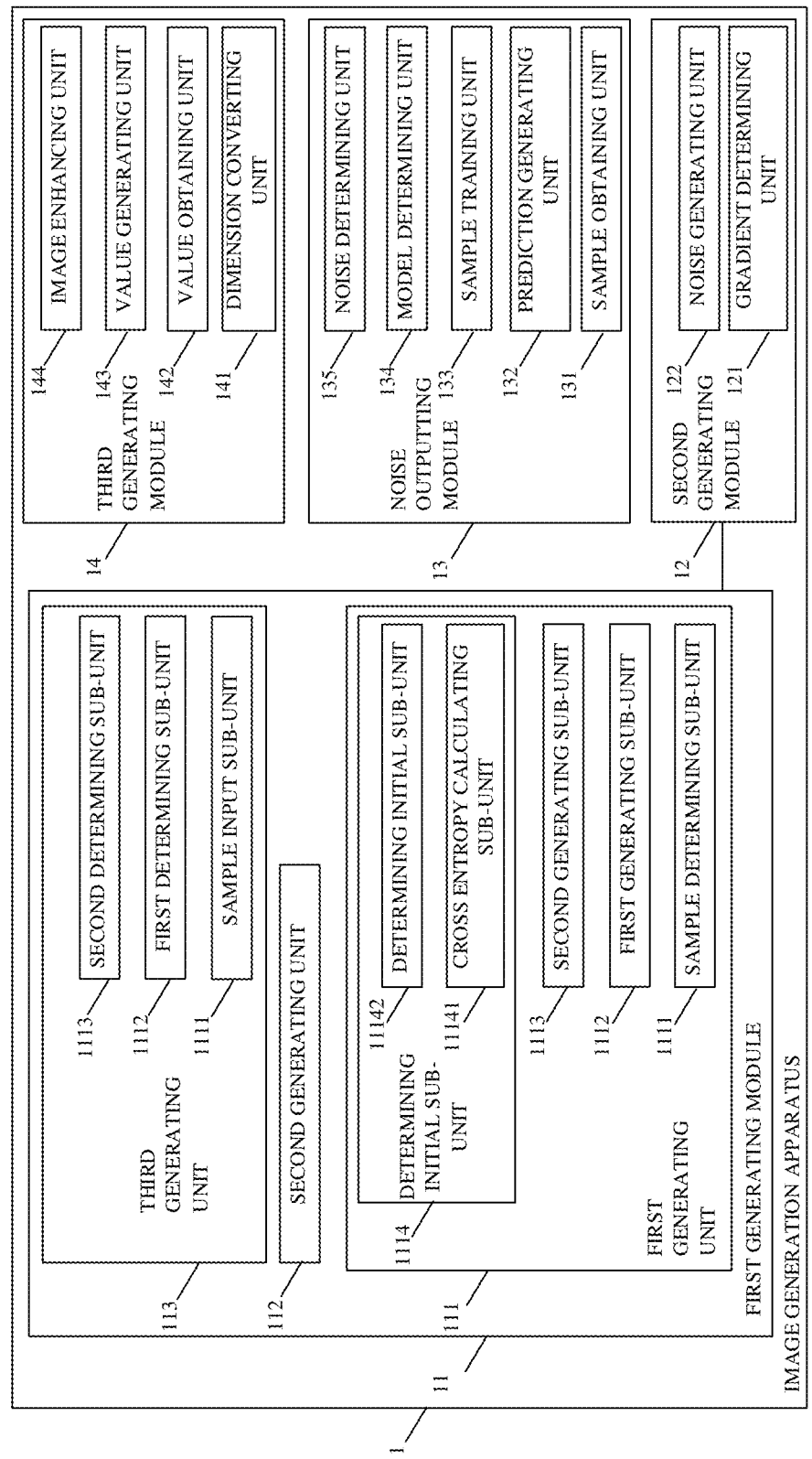
FIG. 12 is a schematic structural diagram of an adversarial image generation apparatus provided in implementations of the present disclosure.

Further, FIG. 12 is a schematic structural diagram of an adversarial image generation apparatus provided in implementations of the present disclosure. The adversarial image generation apparatus 1 may be a computer program (including program codes) running in a computer device. For example, the adversarial image generation apparatus 1 is an application software. The apparatus may be configured to execute corresponding operations in the methods provided in the implementations of the present disclosure. As illustrated in FIG. 12, the adversarial image generation apparatus 1 may include a first generating module 11, a second generating module 12, a noise outputting module 13, and a third generating module 14.

The first generating module 11 is configured to generate a reference model according to a target classification model, where the reference model is classification-equivalent with the target classification model.

The second generating module 12 is configured to obtain a target image and generate an original noise for the target image according to the reference model.

The noise outputting module 13 is configured to input a first noise and the original noise into an adversarial model and output a second noise corresponding to the first noise when the adversarial model meets a convergence condition, where the second noise enhances an information entropy of the original noise.

The third generating module 14 is configured to generate an enhanced noise image corresponding to the target image according to the second noise and the target image, where a classification accuracy of the enhanced noise image in the target classification model is less than a classification accuracy of the target image in the target classification model.

The specific functional implementations of the first generating module 11, the second generating module 12, the noise outputting module 13, and the third generating module 14 can be referred to step S101 to step S104 in the implementation corresponding to FIG. 3, which will not be repeated herein.

Referring to FIG. 12, the noise outputting module 13 may include a sample obtaining unit 131, a prediction generating unit 132, a sample training unit 133, a model determining unit 134, and a noise determining unit 135.

The sample obtaining unit 131 is configured to obtain a sample generation model and a sample discrimination model.

The prediction generating unit 132 is configured to generate a predicted generated noise corresponding to the first noise according to the sample generation model.

The sample training unit 133 is configured to train the sample discrimination model according to the predicted generated noise and the original noise to obtain the discrimination model.

The model determining unit 134 is configured to train the sample generation model according to the discrimination model and the predicted generated noise until a noise matching degree output by the discrimination model is greater than a noise matching degree threshold, and determine the trained sample generation model as the generation model, where the noise matching degree represents the noise matching degree between the original noise and the predicted generated noise.

The noise determining unit 135 is configured to determine a predicted enhanced noise generated for the first noise by the generation model as the second noise The specific functional implementations of the sample obtaining unit 131, the prediction generating unit 132, the sample training unit 133, the model determining unit 134, and the noise determining unit 135 can be referred to step S103 in the implementation corresponding to FIG. 3, which will not be repeated herein.

Referring to FIG. 12, the second generating module 12 includes a gradient determining unit 121 and a noise generating unit 122.

The gradient determining unit 121 is configured to determine gradient information of the target image in the reference model according to model structure information of the reference model.

The noise generating unit 122 is configured to obtain a disturbance factor and generate the original noise for the target image according to the gradient information and the disturbance factor.

The specific functional implementations of the gradient determining unit 121 and the noise generating unit 122 can be referred to step S102 in the implementation corresponding to FIG. 3, which will not be repeated herein.

Referring to FIG. 12, the first generating module 11 includes a first generating unit 111, a second generating unit 112, and a third generating unit 113.

The first generating unit 111 is configured to generate a classification-equivalent initial model according to the target classification model.

The second generating unit 112 is configured to obtain a first tensor set and input the first tensor set into the target classification model to obtain an output tensor set corresponding to the first tensor set.

The third generating unit 113 is configured to use the first tensor set as a training sample and use the output tensor set as a sample label, and train the classification-equivalent initial model according to the training sample and the sample label, to obtain the reference model that is classification-equivalent with the target classification model.

The specific functional implementations of the first generating unit 111, the second generating unit 112, and the third generating unit 113 can be referred to step S101 in the implementation corresponding to FIG. 3, which will not be repeated herein.

Referring to FIG. 12, the first generating unit 111 includes a sample determining sub-unit 1111, a first generating sub-unit 1112, a second generating sub-unit 1113, and a determining initial sub-unit 1114.

The sample determining sub-unit 1111 is configured to determine a sample image set and at least two sample models according to the target classification model.

The first generating sub-unit 1112 is configured to obtain target classification information corresponding to the sample image set according to the target classification model.

The second generating sub-unit 1113 is configured to obtain predicted classification information corresponding to the sample image set respectively according to the at least two sample models.

The determining initial sub-unit 1114 is configured to determine the classification-equivalent initial model from the at least two sample models according to the target classification information and at least two pieces of predicted classification information.

The specific functional implementations of the sample determining sub-unit 1111, the first generating sub-unit 1112, the second generating sub-unit 1113, and the determining initial sub-unit 1114 can be referred to step S101 in the implementation corresponding to FIG. 3, which will not be repeated herein.

Referring to FIG. 12, the determining initial sub-unit 1114 includes a cross entropy calculating sub-unit 11141 and a determining initial sub-unit 11142.

The cross entropy calculating sub-unit 11141 is configured to calculate a cross entropy between each of the at least two pieces of predicted classification information and the target classification information to obtain at least two cross entropies.

The determining initial sub-unit 11142 is configured to determine a minimum cross entropy among the at least two cross entropies and determine a sample model to which a predicted classification information corresponding to the minimum cross entropy belongs as the classification-equivalent initial model.

The specific functional implementations of the cross entropy calculating sub-unit 11141 and the determining initial sub-unit 11142 can be referred to step S101 in the implementation corresponding to FIG. 3, which will not be repeated herein.

Referring to FIG. 12, the third generating unit 113 includes a sample input sub-unit 1131, a first determining sub-unit 1132, and a second determining sub-unit 1133.

The sample input sub-unit 1131 is configured to input the training sample and the sample label into the classification-equivalent initial model.

The first determining sub-unit 1132 is configured to obtain a predicted label corresponding to the training sample according to the classification-equivalent initial model.

The second determining sub-unit 1133 is configured to train the classification-equivalent initial model according to the predicted label and the sample label until a model loss value is less than a model loss threshold, and determine the trained classification-equivalent initial model as the reference model, where the model loss value is generated based on the predicted label and the sample label.

The specific functional implementations of the sample input sub-unit 1131, the first determining sub-unit 1132, and the second determining sub-unit 1133 can be referred to step S101 in the implementation corresponding to FIG. 3, which will not be repeated herein.

Referring to FIG. 12, the third generating module 14 includes a dimension converting unit 141, a value obtaining unit 142, a value generating unit 143, and an image enhancing unit 144.

The dimension converting unit 141 is configured to convert the target image into a target image vector according to a noise vector of the second noise, where the target image vector has a same dimension as the noise vector.

The value obtaining unit 142 is configured to obtain a value $P_i$ in the noise vector and a value $Q_i$ in the target image vector, where i is a positive integer less than or equal to N, N is the number of dimensions of the noise vector or the target image vector, $P_i$ is a value corresponding to the i-th dimension of the noise vector, and $Q_i$ is a value corresponding to the i-th dimension of the target image vector.

The value generating unit 143 is configured to add the value $P_i$ to the value $Q_i$ to generate a value $R_i$.

The image enhancing unit 144 is configured to generate the enhanced noise image having a same dimension as the target image according to the value $R_i$.

The specific functional implementations of the dimension converting unit 141, the value obtaining unit 142, the value generating unit 143, and the image enhancing unit 144 can be referred to step S104 in the implementation corresponding to FIG. 3, which will not be repeated herein.

According to the implementations of the present disclosure, the reference model that is classification-equivalent with the target classification model is generated according to the target classification model. The target image is obtained and the original noise for the target image is generated according to the reference model. The first noise and the original noise are input into the adversarial model and the second noise corresponding to the first noise is output when the adversarial model meets the convergence condition, where the second noise enhances the information entropy of the original noise. The enhanced noise image corresponding to the target image is generated according to the second noise and the target image, where the classification accuracy of the enhanced noise image in the target classification model is less than the classification accuracy of the target image in the target classification model. From the above, by constructing the reference model (white box model) that is function-equivalent with the target classification model (black box model), the original noise for the target image can be generated. On the basis of the above-mentioned original noise, the noise information entropy of the original noise is increased through the adversarial model to obtain the second noise, that is, the obfuscated adversarial example, which brings huge challenges to the traditional defense method. In addition, the obfuscated adversarial examples produced by the adversarial model are endless, and a large number of obfuscated adversarial samples further increase the difficulty of defense work. The second noise and the target image are superimposed to obtain the enhanced noise image, where changes in the enhanced noise image are not easy to be noticed by human eyes, but the target classification model cannot accurately classify the enhanced noise image, that is, the accuracy of the target classification model is reduced. In the same way, when the second noise for the important image is added to the image, the illegal target classification model cannot identify the important image, which ensures data security.

Figure 13:
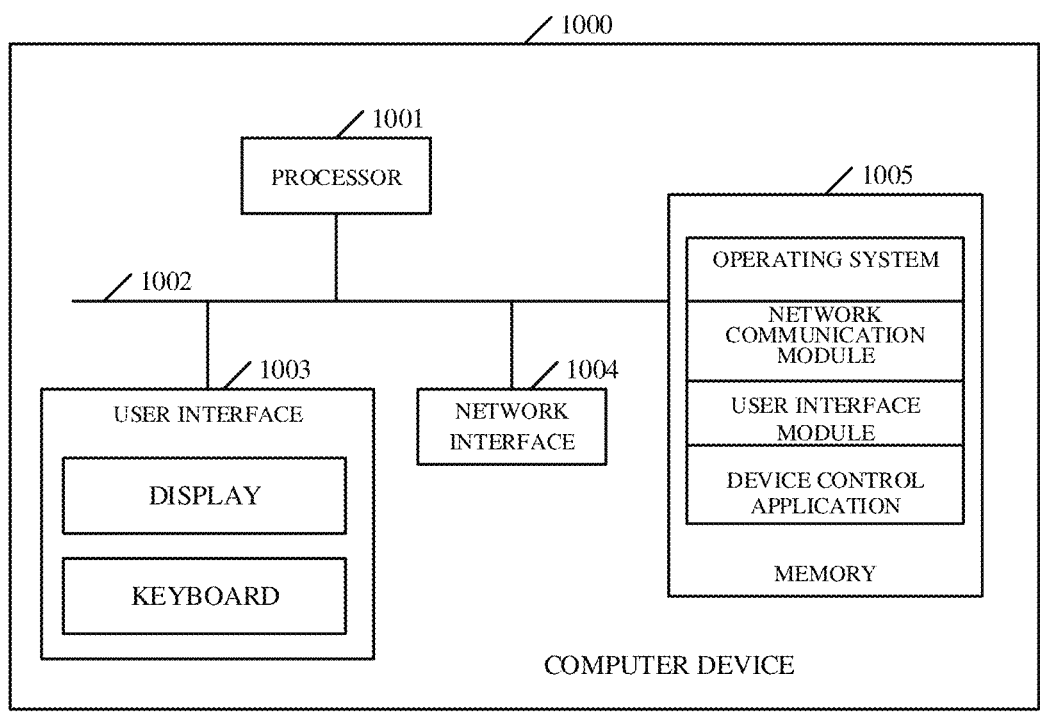
FIG. 13 is a schematic structural diagram of a computer device provided in implementations of the present disclosure.

FIG. 13 is a schematic structural diagram of a computer device provided in implementations of the present disclosure. As illustrated in FIG. 13, the computer device 1000 may include a processor 1001, a network interface 1004, and a memory 1005. In addition, the computer device 1000 may further include a user interface 1003, and at least one communication bus 1002. The communication bus 1002 is configured to implement connection and communication between these components. The user interface 1003 may include a display and a keyboard, and optionally the user interface 1003 may also include a standard wired interface and a wireless interface. The network interface 1004 may optionally include a standard wired interface and a wireless interface (such as a Wi-Fi interface). The memory 1005 may be a high-speed RAM memory, or a non-volatile memory, for example, at least one magnetic disk memory. Optionally, the memory 1005 may also be at least one storage device located far away from the foregoing processor 1001. As illustrated in FIG. 13, the memory 1005, which is a computer-readable storage medium, may include an operating system, a network communication module, a user interface module, and a device control application.

In the computer device 1000 illustrated in FIG. 13, the network interface 1004 can provide network communication functions. The user interface 1003 is mainly configured to provide an input interface for the user. The processor 1001 may invoke the device control application stored in the memory 1005 to: generate a reference model according to a target classification model, where the reference model is classification-equivalent with a the target classification model; obtain a target image and generate an original noise for the target image according to the reference model; input a first noise and the original noise into an adversarial model and output a second noise corresponding to the first noise when the adversarial model meets a convergence condition, where the second noise enhances an information entropy of the original noise; and generate an enhanced noise image corresponding to the target image according to the second noise and the target image, where a classification accuracy of the enhanced noise image in the target classification model is less than a classification accuracy of the target image in the target classification model.

In an implementation, the adversarial model includes a generation model and a discrimination model. In terms of inputting the first noise and the original noise into the adversarial model and outputting the second noise corresponding to the first noise when the adversarial model meets the convergence condition, the processor 1001 may invoke the device control application to: obtain a sample generation model and a sample discrimination model; generate a predicted generated noise corresponding to the first noise according to the sample generation model; train the sample discrimination model according to the predicted generated noise and the original noise to obtain the discrimination model; train the sample generation model according to the discrimination model and the predicted generated noise until a noise matching degree output by the discrimination model is greater than a noise matching degree threshold, and determine the trained sample generation model as the generation model, where the noise matching degree represents the noise matching degree between the original noise and the predicted generated noise; and determine a predicted enhanced noise generated for the first noise by the generation model as the second noise.

In an implementation, in terms of generating the original noise for the target image according to the reference model, the processor 1001 may invoke the device control application to: determine gradient information of the target image in the reference model according to model structure information of the reference model; and obtain a disturbance factor and generate the original noise for the target image according to the gradient information and the disturbance factor.

In an implementation, in terms of generating the reference model that is classification-equivalent with the target classification model according to the target classification model, the processor 1001 may invoke the device control application to: generate a classification-equivalent initial model according to the target classification model; obtain a first tensor set and input the first tensor set into the target classification model to obtain an output tensor set corresponding to the first tensor set; and use the first tensor set as a training sample and use the output tensor set as a sample label, and train the classification-equivalent initial model according to the training sample and the sample label, to obtain the reference model that is classification-equivalent with the target classification model.

In an implementation, in terms of generating the classification-equivalent initial model according to the target classification model, the processor 1001 may invoke the device control application to: determine a sample image set and at least two sample models according to the target classification model; obtain target classification information corresponding to the sample image set according to the target classification model; obtain predicted classification information corresponding to the sample image set respectively according to the at least two sample models; and determine the classification-equivalent initial model from the at least two sample models according to the target classification information and at least two pieces of predicted classification information.

In an implementation, in terms of determining the classification-equivalent initial model from the at least two sample models according to the target classification information and the at least two pieces of predicted classification information, the processor 1001 may invoke the device control application to: calculate a cross entropy between each of the at least two pieces of predicted classification information and the target classification information to obtain at least two cross entropies; and determine a minimum cross entropy among the at least two cross entropies and determine a sample model to which predicted classification information corresponding to the minimum cross entropy belongs as the classification-equivalent initial model.

In an implementation, in terms of training the classification-equivalent initial model according to the training sample and the sample label to obtain the reference model, the processor 1001 may invoke the device control application to: input the training sample and the sample label into the classification-equivalent initial model; obtain a predicted label corresponding to the training sample according to the classification-equivalent initial model; and train the classification-equivalent initial model according to the predicted label and the sample label until a model loss value is less than a model loss threshold, and determine the trained classification-equivalent initial model as the reference model, where the model loss value is generated based on the predicted label and the sample label.

In an implementation, in terms of generating the enhanced noise image corresponding to the target image according to the second noise and the target image, the processor 1001 may invoke the device control application to: convert the target image into a target image vector according to a noise vector of the second noise, where the target image vector has a same dimension as the noise vector; obtain a value $P_i$ in the noise vector and a value $Q_i$ in the target image vector, where i is a positive integer less than or equal to N, N is the number of dimensions of the noise vector or the target image vector, $P_i$ is a value in the noise vector corresponding to the i-th dimension, and $Q_i$ is a value in the target image vector corresponding to the i-th dimension; add the value $P_i$ to the value $Q_i$ to generate a value $R_i$; and generate the enhanced noise image having a same dimension as the target image according to the value $R_i$.

According to the implementations of the present disclosure, the reference model that is classification-equivalent with the target classification model is generated according to the target classification model. The target image is obtained and the original noise for the target image is generated according to the reference model. The first noise and the original noise are input into the adversarial model and the second noise corresponding to the first noise is output when the adversarial model meets the convergence condition, where the second noise enhances the information entropy of the original noise. The enhanced noise image corresponding to the target image is generated according to the second noise and the target image, where the classification accuracy of the enhanced noise image in the target classification model is less than the classification accuracy of the target image in the target classification model. From the above, by constructing the reference model (white box model) that is function-equivalent with the target classification model (black box model), the original noise for the target image can be generated. On the basis of the above-mentioned original noise, the noise information entropy of the original noise is increased through the adversarial model to obtain the second noise, that is, the obfuscated adversarial example, which brings huge challenges to the traditional defense method. In addition, the obfuscated adversarial examples produced by the adversarial model are endless, and a large number of obfuscated adversarial samples further increase the difficulty of defense work. The second noise and the target image are superimposed to obtain the enhanced noise image, where changes in the enhanced noise image are not easy to be noticed by human eyes, but the target classification model cannot accurately classify the enhanced noise image, that is, the accuracy of the target classification model is reduced. In the same way, when the second noise for the important image is added to the image, the illegal target classification model cannot identify the important image, which ensures data security.

The implementations of the present disclosure also provide a computer-readable storage medium. The computer-readable storage medium stores a computer program. The computer program includes program instructions which, when executed by a processor, implements the adversarial image generation method provided in each step in FIG. 3. Reference can be made to the implementations provided in each step in FIG. 3, which will not be repeated herein.

The computer-readable storage medium may be an internal storage unit of the adversarial image generation apparatus or the computer device provided in any of the foregoing implementations, such as a hard disk or memory of the computer device. The computer-readable storage medium may also be an external storage device of the computer device, such as a plug-in hard disk, a smart media card (SMC), a secure digital (SD) card, or a flash card, etc. equipped on the computer device. Further, the computer-readable storage medium may also include both an internal storage unit of the computer device and an external storage device. The computer-readable storage medium is configured to store the computer program and other programs and data required by the computer device. The computer-readable storage medium can also be configured to temporarily store data that has been output or will be output.

The terms "first", "second" or the like in the description and claims of the implementations of the present disclosure and the drawings are used to distinguish different objects, rather than to describe a specific sequence. In addition, the term "including" and any variations thereof are intended to cover non-exclusive inclusion. For example, a process, method, device, product, or equipment that includes a series of steps or units is not limited to the listed steps or modules, but optionally includes unlisted steps or modules, or optionally also includes other step units inherent to these processes, methods, devices, products or equipment.

A person of ordinary skill in the art may realize that the units and algorithm steps of the examples described in the implementations disclosed herein can be implemented by electronic hardware, computer software, or a combination thereof. In order to clearly illustrate interchangeability between the hardware and software, in the above description, the components and steps of each example have been generally described in accordance with the function. Whether these functions are executed by hardware or software depends on the specific application and design constraint conditions of the technical solution. Professionals and technicians can use different methods for each specific application to implement the described functions, but such implementation should not be considered beyond the scope of this application.

The methods and related devices provided in the implementations of the present disclosure are described with reference to the method flowcharts and/or schematic structural diagrams provided in the implementations of the present disclosure. Specifically, each process and/or block in the method flowcharts and/or schematic structural diagrams and a combination thereof can be implemented by computer program instructions. These computer program instructions can be provided to the processor of a general-purpose computer, a special-purpose computer, an embedded processor, or other programmable data processing equipment to generate a machine, so that an apparatus that is configured to implement functions specified in one or more processes in the flowcharts and/or one or more blocks in the schematic structural diagrams can be generated through instructions executed by a computer or other programmable data processing equipment. These computer program instructions can also be stored in a computer-readable memory that can direct a computer or other programmable data processing equipment to work in a specific manner, so that the instructions stored in the computer-readable memory produce an article of manufacture including the instruction device, where the instruction device implements the functions specified in one or more processes in the flowcharts and/or one or more blocks in the schematic structural diagrams. These computer program instructions can also be loaded on a computer or other programmable data processing equipment, so that a series of operation steps are executed on the computer or other programmable equipment to produce computer-implemented processing, so that instructions executed on the computer or other programmable equipment provide steps for implementing functions specified in one or more blocks in the flowcharts or one or more blocks in the schematic structural diagrams.

The above-disclosed are only the some implementations of the present disclosure, which cannot be used to limit the scope of rights of the disclosure. Therefore, equivalent changes made in accordance with the claims of the application still fall within the scope of the disclosure.

What is claimed is:

1. An adversarial image generation method, comprising:
generating a reference model according to a target classification model, wherein the reference model is classification-equivalent with the target classification model;
obtaining a target image and generating an original noise for the target image according to the reference model;
inputting a first noise and the original noise into an adversarial model and outputting a second noise corresponding to the first noise when the adversarial model meets a convergence condition, wherein the second noise enhances an information entropy of the original noise; and
generating an enhanced noise image corresponding to the target image according to the second noise and the target image, wherein a classification accuracy of the enhanced noise image in the target classification model is less than a classification accuracy of the target image in the target classification model.

2. The method of claim 1, wherein the adversarial model comprises a generation model and a discrimination model, and inputting the first noise and the original noise into the adversarial model and outputting the second noise corresponding to the first noise when the adversarial model meets the convergence condition comprises:
obtaining a sample generation model and a sample discrimination model;
generating a predicted generated noise corresponding to the first noise according to the sample generation model;
training the sample discrimination model according to the predicted generated noise and the original noise to obtain the discrimination model;
training the sample generation model according to the discrimination model and the predicted generated noise until a noise matching degree output by the discrimination model is greater than a noise matching degree threshold, and determining the trained sample generation model as the generation model, wherein the noise matching degree represents the noise matching degree between the original noise and the predicted generated noise; and
determining a predicted enhanced noise generated for the first noise by the generation model as the second noise.

3. The method of claim 1, wherein generating the original noise for the target image according to the reference model comprises:
determining gradient information of the target image in the reference model according to model structure information of the reference model; and
obtaining a disturbance factor and generating the original noise for the target image according to the gradient information and the disturbance factor.

4. The method of claim 1, wherein generating the reference model according to the target classification model comprises:
generating a classification-equivalent initial model according to the target classification model;
obtaining a first tensor set and inputting the first tensor set into the target classification model to obtain an output tensor set corresponding to the first tensor set; and
using the first tensor set as a training sample and using the output tensor set as a sample label, and training the classification-equivalent initial model according to the training sample and the sample label, to obtain the reference model that is classification-equivalent with the target classification model.

5. The method of claim 4, wherein generating the classification-equivalent initial model according to the target classification model comprises:
determining a sample image set and at least two sample models according to the target classification model;
obtaining target classification information corresponding to the sample image set according to the target classification model;
obtaining predicted classification information corresponding to the sample image set respectively according to the at least two sample models; and
determining the classification-equivalent initial model from the at least two sample models according to the target classification information and at least two pieces of predicted classification information.

6. The method of claim 5, wherein determining the classification-equivalent initial model from the at least two sample models according to the target classification information and the at least two pieces of predicted classification information comprises:
calculating a cross entropy between each of the at least two pieces of predicted classification information and the target classification information to obtain at least two cross entropies; and
determining a minimum cross entropy among the at least two cross entropies and determining a sample model to which predicted classification information corresponding to the minimum cross entropy belongs as the classification-equivalent initial model.

7. The method of claim 4, wherein training the classification-equivalent initial model according to the training sample and the sample label to obtain the reference model that is classification-equivalent with the target classification model comprises:
inputting the training sample and the sample label into the classification-equivalent initial model;
obtaining a predicted label corresponding to the training sample according to the classification-equivalent initial model; and
training the classification-equivalent initial model according to the predicted label and the sample label until a model loss value is less than a model loss threshold, and determining the trained classification-equivalent initial model as the reference model, wherein the model loss value is generated based on the predicted label and the sample label.

8. The method of claim 1, where generating the enhanced noise image corresponding to the target image according to the second noise and the target image comprises:
converting the target image into a target image vector according a noise vector of the second noise, wherein the target image vector has a same dimension as the noise vector;
obtaining a value $P_i$ in the noise vector and a value $Q_i$ in the target image vector, wherein i is a positive integer less than or equal to N, N is the number of dimensions of the noise vector or the target image vector, $P_i$ is a value in the noise vector corresponding to the i-th dimension, and $Q_i$ is a value in the target image vector corresponding to the i-th dimension;
adding the value $P_i$ to the value $Q_i$ to generate a value $R_i$; and generating the enhanced noise image having a same dimension as the target image according to the value $R_i$.

9. A computer device, comprising a processor, a memory, and a network interface, wherein the processor is coupled with the memory and the network interface, the network interface is configured to provide a data communication function, the memory is configured to store program codes, and the processor is configured to invoke the program codes to:

generate a reference model according to a target classification model, wherein the reference model is classification-equivalent with the target classification model;

obtain a target image and generating an original noise for the target image according to the reference model;

input a first noise and the original noise into an adversarial model and output a second noise corresponding to the first noise when the adversarial model meets a convergence condition, wherein the second noise enhances an information entropy of the original noise; and generate an enhanced noise image corresponding to the target image according to the second noise and the target image, wherein a classification accuracy of the enhanced noise image in the target classification model is less than a classification accuracy of the target image in the target classification model.

10. The computer device of claim 9, wherein the adversarial model comprises a generation model and a discrimination model, and the processor configured to invoke the program codes to input the first noise and the original noise into the adversarial model and output the second noise corresponding to the first noise when the adversarial model meets the convergence condition is configured to invoke the program codes to:

obtain a sample generation model and a sample discrimination model;

generate a predicted generated noise corresponding to the first noise according to the sample generation model;

train the sample discrimination model according to the predicted generated noise and the original noise to obtain the discrimination model;

train the sample generation model according to the discrimination model and the predicted generated noise until a noise matching degree output by the discrimination model is greater than a noise matching degree threshold, and determine the trained sample generation model as the generation model, wherein the noise matching degree represents the noise matching degree between the original noise and the predicted generated noise; and determine a predicted enhanced noise generated for the first noise by the generation model as the second noise.

11. The computer device of claim 9, wherein the processor configured to invoke the program codes to generate the original noise for the target image according to the reference model is configured to invoke the program codes to:

determine gradient information of the target image in the reference model according to model structure information of the reference model; and obtain a disturbance factor and generate the original noise for the target image according to the gradient information and the disturbance factor.

12. The computer device of claim 9, wherein the processor configured to invoke the program codes to generate the reference model according to the target classification model is configured to invoke the program codes to:

generate a classification-equivalent initial model according to the target classification model;

obtain a first tensor set and inputting the first tensor set into the target classification model to obtain an output tensor set corresponding to the first tensor set; and use the first tensor set as a training sample and use the output tensor set as a sample label, and train the classification-equivalent initial model according to the training sample and the sample label, to obtain the reference model that is classification-equivalent with the target classification model.

13. The computer device of claim 12, wherein the processor configured to invoke the program codes to generate the classification-equivalent initial model according to the target classification model is configured to invoke the program codes to:

determine a sample image set and at least two sample models according to the target classification model;

obtain target classification information corresponding to the sample image set according to the target classification model;

obtain predicted classification information corresponding to the sample image set respectively according to the at least two sample models; and determine the classification-equivalent initial model from the at least two sample models according to the target classification information and at least two pieces of predicted classification information.

14. The computer device of claim 13, wherein the processor configured to invoke the program codes to determine the classification-equivalent initial model from the at least two sample models according to the target classification information and the at least two pieces of predicted classification information is configured to invoke the program codes to:

calculate a cross entropy between each of the at least two pieces of predicted classification information and the target classification information to obtain at least two cross entropies; and determine a minimum cross entropy among the at least two cross entropies and determining a sample model to which predicted classification information corresponding to the minimum cross entropy belongs as the classification-equivalent initial model.

15. The computer device of claim 12, wherein the processor configured to invoke the program codes to train the classification-equivalent initial model according to the training sample and the sample label to obtain the reference model that is classification-equivalent with the target classification model is configured to invoke the program codes to:

input the training sample and the sample label into the classification-equivalent initial model;

obtain a predicted label corresponding to the training sample according to the classification-equivalent initial model; and train the classification-equivalent initial model according to the predicted label and the sample label until a model loss value is less than a model loss threshold, and determine the trained classification-equivalent initial model as the reference model, wherein the model loss value is generated based on the predicted label and the sample label.

16. The computer device of claim 9, wherein the processor configured to invoke the program codes to generate the enhanced noise image corresponding to the target image according to the second noise and the target image is configured to invoke the program codes to:

convert the target image into a target image vector according a noise vector of the second noise, wherein the target image vector has a same dimension as the noise vector;

obtain a value $P_i$ in the noise vector and a value $Q_i$ in the target image vector, wherein i is a positive integer less than or equal to N, N is the number of dimensions of the noise vector or the target image vector, $P_i$ is a value in the noise vector corresponding to the i-th dimension, and $Q_i$ is a value in the target image vector corresponding to the i-th dimension;

add the value $P_i$ to the value $Q_i$ to generate a value $R_i$; and generate the enhanced noise image having a same dimension as the target image according to the value $R_i$.

17. A non-transitory computer-readable storage medium storing a computer program, the computer program comprising program instructions which, when executed by a processor, cause the processor to:

generate a reference model according to a target classification model, wherein the reference model is classification-equivalent with the target classification model;

obtain a target image and generating an original noise for the target image according to the reference model;

input a first noise and the original noise into an adversarial model and output a second noise corresponding to the first noise when the adversarial model meets a convergence condition, wherein the second noise enhances an information entropy of the original noise; and generate an enhanced noise image corresponding to the target image according to the second noise and the target image, wherein a classification accuracy of the enhanced noise image in the target classification model is less than a classification accuracy of the target image in the target classification model.

18. The non-transitory computer-readable storage medium of claim 17, wherein the adversarial model comprises a generation model and a discrimination model, and the program instructions executed by the processor to input the first noise and the original noise into the adversarial model and output the second noise corresponding to the first noise when the adversarial model meets the convergence condition are executed by the processor to:

obtain a sample generation model and a sample discrimination model;

generate a predicted generated noise corresponding to the first noise according to the sample generation model;

train the sample discrimination model according to the predicted generated noise and the original noise to obtain the discrimination model;

train the sample generation model according to the discrimination model and the predicted generated noise until a noise matching degree output by the discrimination model is greater than a noise matching degree threshold, and determine the trained sample generation model as the generation model, wherein the noise matching degree represents the noise matching degree between the original noise and the predicted generated noise; and determine a predicted enhanced noise generated for the first noise by the generation model as the second noise.

19. The non-transitory computer-readable storage medium of claim 17, wherein the program instructions executed by the processor to generate the original noise for the target image according to the reference model are executed by the processor to:

determine gradient information of the target image in the reference model according to model structure information of the reference model; and obtain a disturbance factor and generate the original noise for the target image according to the gradient information and the disturbance factor.

20. The non-transitory computer-readable storage medium of claim 17, wherein the program instructions executed by the processor to generate the reference model according to the target classification model are executed by the processor to:

generate a classification-equivalent initial model according to the target classification model;

obtain a first tensor set and inputting the first tensor set into the target classification model to obtain an output tensor set corresponding to the first tensor set; and use the first tensor set as a training sample and use the output tensor set as a sample label, and train the classification-equivalent initial model according to the training sample and the sample label, to obtain the reference model that is classification-equivalent with the target classification model.

* * * * *